United States Patent [19]

Silver

[11] 4,223,796
[45] Sep. 23, 1980

[54] ATTACHMENT FOR ELECTRICAL JUNCTION BOX

[76] Inventor: Harry Silver, 1844 Meadowbrook Rd., Abington, Pa. 19001

[21] Appl. No.: 23,048

[22] Filed: Mar. 22, 1979

Related U.S. Application Data

[63] Continuation-in-part of Ser. No. 873,188, Jan. 30, 1978, abandoned.

[51] Int. Cl.² .................................................. H02G 3/08
[52] U.S. Cl. ......................................... 220/3.8; 220/3.7
[58] Field of Search ............................. 220/3.2, 3.7, 3.8; 206/512

[56] References Cited

U.S. PATENT DOCUMENTS

| | | | |
|---|---|---|---|
| 1,991,160 | 2/1935 | Knight | 220/3.7 |
| 2,916,161 | 12/1959 | Schaefer | 206/512 X |
| 3,029,964 | 4/1962 | Hudson et al. | 220/3.8 X |
| 3,288,910 | 11/1966 | Zerwes | 220/3.7 X |
| 3,318,476 | 5/1967 | Clark | 220/3.8 X |
| 3,392,228 | 7/1968 | Zerwes | 220/3.8 X |
| 3,917,101 | 11/1975 | Ware | 220/3.2 |

Primary Examiner—Steven M. Pollard
Attorney, Agent, or Firm—Caesar, Rivise, Bernstein & Cohen, Ltd.

[57] ABSTRACT

In one embodiment the attachment is in the form of a box extender comprising a top wall, a bottom wall and side walls defining a ring of the same general dimensions as the junction box. The extender includes plate portions within the ring and through which screws extend to secure the extender to the box. In another embodiment the attachment comprises a cover having walls defining a ring of the same general dimensions as the box and adapted for securement to the box by the abutment of the peripheral edges of its walls to those of the box. A projecting post is located in each corner and each projects slightly beyond the plane of the peripheral edge of the walls and into firm abutment with the underlying bracket plate when the cover is secured to the box to preclude the plates in the box from being pulled from their support members.

17 Claims, 6 Drawing Figures

ATTACHMENT FOR ELECTRICAL JUNCTION BOX

This application is a continuation-in-part of my copending U.S. Application Ser. No. 873,188 filed on Jan. 30, 1978, now abandoned.

Electrical junction boxes are in common usage for all types of indoor and outdoor installations. Generally, junction boxes are hollow members formed of metal, such as die cast aluminum and including a back wall, a top wall, a bottom wall and a pair of side walls. The walls define an open cavity for the reception of an electrical fixture or a component, such as a receptacle, a switch, a socket, etc. For outdoor applications a gasketed cover plate is placed over the cavity to insulate the electrical component and maintain a weatherproof quality of the electrical junctions within the box. The wires coming into or exiting the box pass through openings in the wall portions thereof. In one common type of construction the wires pass through conduits which are threadedly secured in threaded bosses formed in the walls of the box. Another type of construction is the subject of my U.S. Pat. No. 4,082,915. In that patent there is disclosed a die cast junction box having breakaway clamping means for securing conductors passing through openings in the box.

In order to secure electrical components within junction boxes or to secure the cover plate thereon, junction boxes commonly include a pair of mounting brackets or plates disposed therein. The plates are mounted on supports. In a typical die cast box the brackets are formed as separate components and are mounted on pillars projecting upward from the back wall or side walls of the box. The brackets are secured to the pillars in various ways, depending upon the manufacturer of the box. One manner of securing the brackets to the box is through the use of a threaded fastener, e.g., a screw, passing through an aperture in the brackets and into an underlying hole in the pillar. This construction has several drawbacks from an expense standpoint since it requires screws, substantially sized pillars to accommodate the screws, and a drilling or tapping operation to produce the hole. In addition, the assembly of the plate to the box entails substantial assembly time, if accomplished manually, or complicated machinery, if accomplished automatically. A much preferred manner of securing mounting brackets to the pillars of a junction box from a standpoint of economy is accomplished by using pillars having reduced diameter ends which are extended through aligned apertures in the bracket and then are deformed by impact to produce a rivetted type connection.

As noted heretofore, covers are normally used to seal electrical junction boxes. Among the various types of commercially available covers are: duplex receptacle covers, singlex receptacle covers, switch covers, single outlet covers, blank covers, outdoor lighting covers, toggle covers, waterproof covers, etc. Such covers are secured to the box in one of two manners, depending on the type of cover. For example, some covers, such as blank covers, are secured directly to the box by the use of mounting screws extending through holes in the cover and into aligned holes in the mounting brackets on the box. Other covers, such as duplex receptacle covers, are secured to the box indirectly. By that it is meant the mounting screw(s) extends through a hole(s) in the duplex receptacle cover and into aligned hole(s) in the duplex receptacle itself which is mounted on the brackets within the junction box.

In some applications the depth of a standard junction box is clearly insufficient to accommodate various electrical components. In order to accommodate such components, and thereby increase the utility of conventional junction boxes, extenders for such boxes have been disclosed in the patent literature, e.g., U.S. Pat. No. 3,288,910, and many are commercially available. Typically extenders for junction boxes are in the form of plural wall sections forming an open ring and of the same overall dimension as the walls forming the box. The ring typically is formed as a die casting and is secured to the box by abutting the peripheral edge of its walls to that of the walls of the box. Frequently a gasket is interposed between the abutting edges to form the weather tight seal. The extender is secured to the box by the use of screws which extend through holes in the extender and aligned holes in the mounting brackets of the box.

It has been found that when the screws are tightened to secure a cover or an extender to the box an upward force is applied to the mounting brackets which tends to tear them away from the pillars on which they are secured. The tendency to pull away from the pillars is more pronounced in box constructions wherein the mounting brackets are rivetted in place by the deformation of the pillar's end than in constructions using screw-mounted brackets. Nevertheless, even with the latter type constructions the brackets are susceptible to disconnection from the mounting pillars when an extender is secured to the box.

Accordingly, it is a general object of the instant invention to provide an attachment for a junction box which overcomes the disadvantages of the prior art.

It is a further object of the instant invention to provide an attachment for a junction box which precludes the mounting brackets of the box from becoming disconnected from the box when the attachment is secured thereto.

It is still a further object of the instant invention to provide an attachment for a junction box and including means for holding the mounting brackets in the box in place when the attachment is secured thereto.

It is still a further object of the instant invention to provide an extender for a junction box which includes means for holding mounting brackets in the box in place when the extender is secured thereto.

It is yet a further object of the instant invention to provide a cover for a junction box and including means for holding the mounting brackets in the box in place when the cover is secured thereto.

These and other objects of this invention are achieved by providing an attachment for an electrical junction box. The junction box includes a back wall, a top wall, a bottom wall and side walls defining an open cavity having a mouth. At least one mounting bracket is disposed within the mouth and is secured on the top of a support member located within the cavity. The mounting bracket includes at least one hole. The attachment comprises a top wall, a bottom wall and side walls of substantially the same dimensions as those of the box and defining a mouth. The attachment is arranged for securement to the box by the abutment of the peripheral edges of its walls with the peripheral edges of the walls of the box. The attachment includes at least one plate portion disposed within the mouth and including a hole. Screw means extend through the hole to secure the attachment to the box. The attachment also includes at least one projection located within the mouth and having a free end extending slightly beyond the plane of the peripheral edges of the walls of the attachment, whereupon the free end applied a holding force onto the mounting bracket when the screw is tightened, to thereby preclude the bracket from being pulled off the top of the support member. In one embodiment the attachment is an extender and in another embodiment the attachment is a cover.

Other objects and many of the attendant advantages of this invention will be readily appreciated as the same becomes better understood by reference to the following detailed description when considered in connection with the accompanying drawing wherein.

Referring now in greater detail to the various figures of the drawing wherein like reference characters refer to like parts, an extender embodying the present invention for use with an electrical junction box is shown generally at 20 in FIG. 1.

Figure 1:
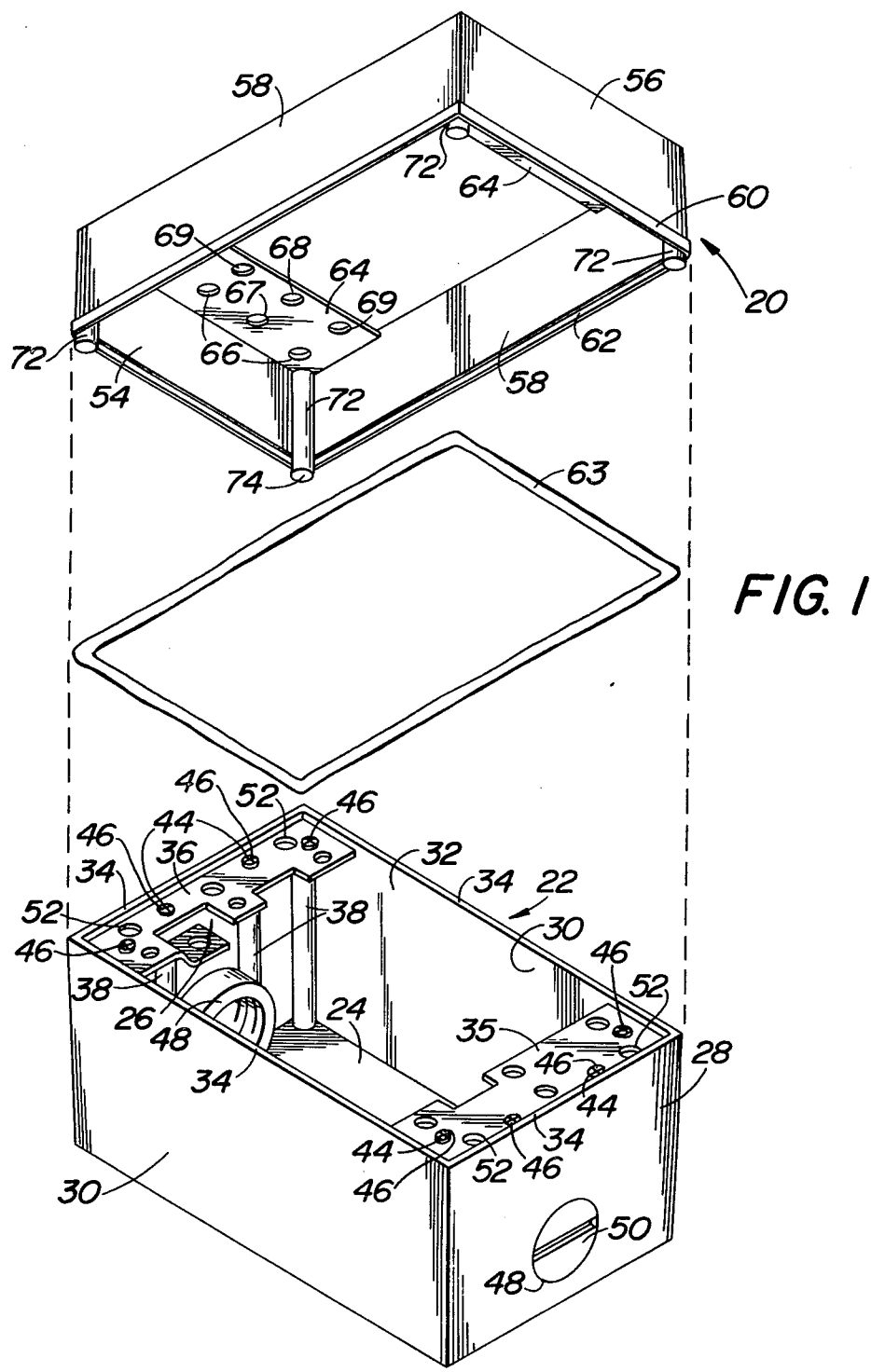
FIG. 1 is an exploded perspective view of an extender in accordance with the instant invention and an associated conventional electrical junction box.

The extender 20 is adapted to be secured to various types of electrical junction boxes to increase the interior volume thereof. One exemplary type box 22 is shown in FIG. 1 and basically comprises a back wall 24, a top wall 26, a bottom wall 28 and a pair of opposed side walls 30.

The junction box is formed by die casting and preferably is composed of a lightweight, water-resistant material, such as aluminum or an aluminum alloy. The walls 24–30 are unitary with each other and define an open cavity 32 for receipt of conventional electrical fixtures or components therein. As seen clearly in FIG. 3, the peripheral edge 34 of each of the walls 26–30 are co-planar and together those walls define the mouth of the cavity 32.

All of the usual interior fixtures of electrical junction boxes now in use are provided within the interior of box 22. For example, as can be seen in FIG. 1, the top wall 26 and the bottom wall 28 of the box 22 each include a threaded boss 48 for receipt of the threaded end of a conduit (not shown) which is used to carry electrical conductors into the box. When a boss 48 is not used for connection to a conduit a threaded plug 50 is disposed therein. The box 22 also includes means for mounting electrical components therein in the form of a pair of individual brackets 35 and 36. The component mounting brackets 35 and 36 are disposed within the cavity 32 adjacent its mouth, with one bracket being located immediately adjacent to top wall 26 and the other bracket 35 being located immediately adjacent to bottom wall 28. The brackets 35 and 36 are preferably formed of stampings of aluminum or an aluminum alloy and are mounted on plural pillars 38. The pillars are formed integrally with the walls of the box 22 and are elongated projections extending forward from the back wall 24 to a point slightly below the plane of the peripheral edge of the walls 26–30.

Figure 4:
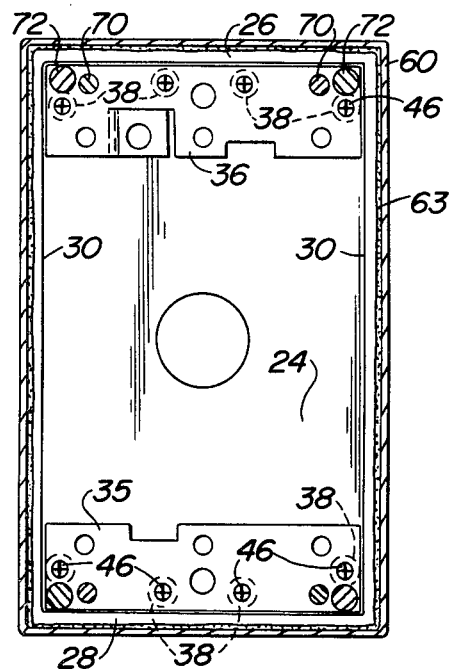
FIG. 4 is a reduced cross-sectional view taken along line 4—4 of FIG. 3.
Figure 2:
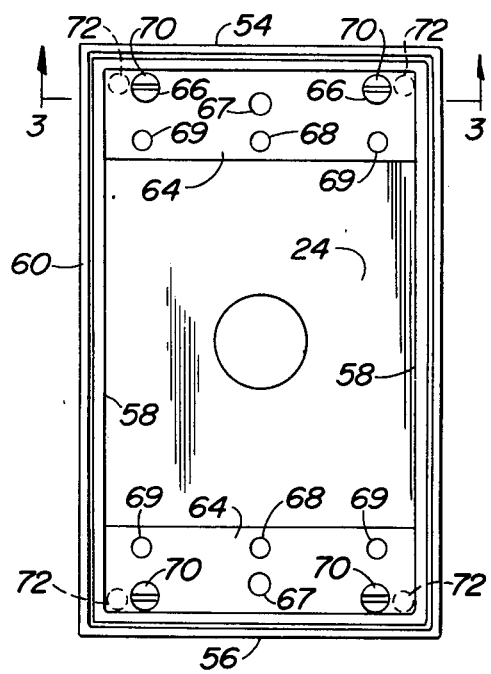
FIG. 2 is a plan view of the components shown in FIG. 1 when assembled.
Figure 3:
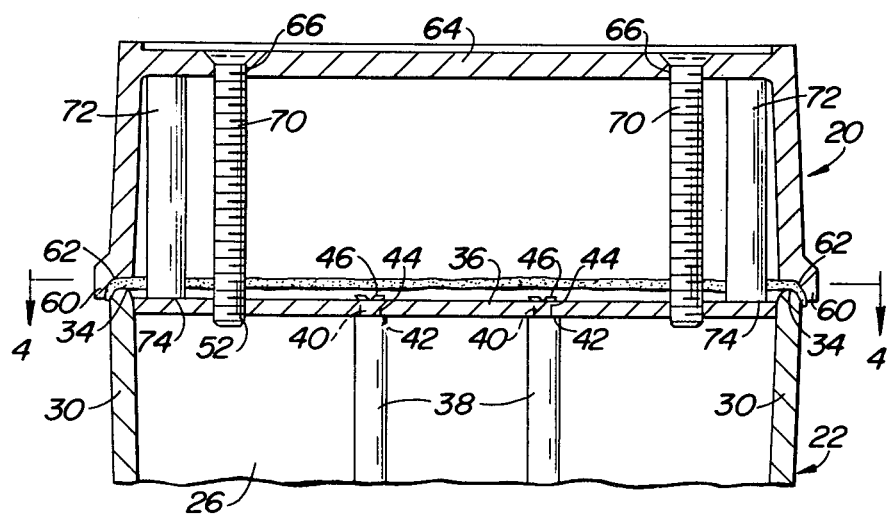
FIG. 3 is an enlarged sectional view taken along line 3—3 of FIG. 2.

As can be seen in FIG. 3, the top end 40 of each of the pillars 38 is of a reduced cross-sectional area and defines a ledge 42 at the interface with the contiguous portion of the pillar. The reduced cross-sectional ends of the pillars 38 extend through aligned apertures 44 in the mounting brackets 35 and 36, with the portion of the bracket contiguous with each hole 44 resting on ledge 42 of the associated pillar. The exposed free end 40 of each pillar 38 is impacted by a tool (not shown) having an X-shaped contact face to deform the free end and spread it out, like a rivet head, an into contact with the top surface of the mounting bracket. The deformed heads of the pillars are shown in FIGS. 1, 3 and 4 and denoted by the reference numeral 46. In the embodiment of the box 22 shown in FIG. 1 four pillars 38 extend along the bottom wall 28 and side walls 30 for mounting bracket 35 while four identical pillars 38 extend along the top wall 26 and side walls 30 for mounting bracket 36.

Each of the brackets 35 and 36 includes plural holes 52 which serve as means mounting electrical components within the cavity of the box. In addition, each bracket includes other holes 52, which are used to mount the extender 20 onto the box 22. To that end, one hole 52 is located within the mounting bracket 36 adjacent to the corner formed by the top wall 26 and one side wall 30, a similar hole 52 is located within the mounting bracket 36 adjacent the corner formed by the top wall 26 and the other side wall 30, a similar hole 52 is located in the mounting plate 35 adjacent the corner formed by bottom wall 28 and one side wall 30 and a similar hole 52 is located within the mounting plate 35 adjacent the corner formed by bottom wall 28 and the other side wall 30.

The extender 22 of this invention comprises a top wall 54, a bottom wall 56 and an opposed pair of side walls 58. In accordance with a preferred embodiment of this invention the walls of the extender 20 are unitary with each other and define an open ring-like structure. Preferably the extender 20 is formed by a die casting process, a comprises a lightweight, water-resistant material, such as aluminum or aluminum alloy. As can be seen in FIG. 3, the bottom peripheral edges of each of the walls 54–58 of the extender are co-planar with one another and is in the form of an offset or outwardly extending lip 60 and inwardly recessed ledge 62. The interior of the bottom peripheral edges of the walls 54–58 form an open mouth.

The length of each of the walls 54–58 of the extender is substantially the same as that of the corresponding wall of the box such that when the extender and the box are connected together the combined structure has a substantially continuous outer surface, except for a slight overlap caused by the lip 60, as can be seen in FIG. 3.

In order to provide means for mounting electrical components within an assembled extender-box assembly the extender includes a pair of planar plates located interiorly and along the top peripheral edge of the extender adjacent to the top wall 54 and bottom wall 56, respectively. The plates are integrally formed with the extender and are denoted by the reference numeral 64.

Each plate includes plural openings 66, 67, 68 and 69 therein. The openings 68 serve as the means for mounting the electrical components within the extender-box assembly while the holes 66 serve as means for effecting the connection of the extender to the box 22 and are hence axially aligned with the holes 52 in the mounting brackets 35 and 36 when the extender is disposed on the box. The openings 69 serve as mounting means for covers when the cover is not mounted on the device itself. The openings 67 serve as recess holes for the mounting screw for the cover plate of a special ground fault indicator device named "GFI".

When the extender 20 is secured to the box 22 the peripheral edge 34 of each of the walls of the box is located within the ledge 62 formed in the peripheral edge of the walls of the extender, with the offset extending lip 60 overlying the outside surface of the walls of the box contiguous with their peripheral edge 34. In order to provide a watertight seal between the box and the extender a gasketing means is disposed within ledge 62 about the entire periphery of the walls of the box. The gasketing means can be of any suitable type resilient material. In accordance with a preferred embodiment of this invention the gasket is formed as an elongated bead by extruding a line of unset Room Temperature Vulcanized (RTV) Silicone sealant in ledge 62 along the entire periphery of the side walls and allowing the sealant to cure. Owing to the resilient nature of the gasket a portion of it extrudes slightly outward under the lip 60 when the extender is tightly secured to the box (see FIG. 3).

In order to secure the extender to the box plural screws 70 are used. To that end, one pair of screws 70 extend through respective openings 66 in the mounting plates 64 of the extender and aligned respective openings 52 in the mounting bracket 36. A similar pair of screws 70 extend through the holes 66 in the other mounting plate 64 of the extender and the aligned holes 52 in the mounting bracket 35 of the box 22. When the screws are tightened they coact with the holes through which they pass to pull the box and extender together.

In accordance with this invention means are provided within the extender 20 to ensure that when the screws 70 are tightened the mounting brackets 35 and 36 are not pulled off of their associated support pillars 38. To that end, as can be seen in FIG. 3, the extender 20 includes four projections or posts 72. Each post is located within a respective corner of the extender and projects from the inside surface of the mounting plates outward, with the free end 74 of each post lying in a common plane extending slightly beyond the peripheral edge of the walls making up the extender. Accordingly, when the screws are tightened the free end 74 of each post 72 makes contact with the top surface of the underlying bracket. This action provides a downward or holding force on each of the brackets 35 and 36 to counteract the upward force produced by the tightening of screws 70, so that the mounting brackets 35 and 36 are held in place and are precluded from being pulled off their mounting pillars 38.

The posts 72 also facilitate the assembly of the extender and the electrical junction box by serving as alignment means to align the extender with the box so that the screws 70 can be extended through aligned holes 66 and 52.

Figure 5:
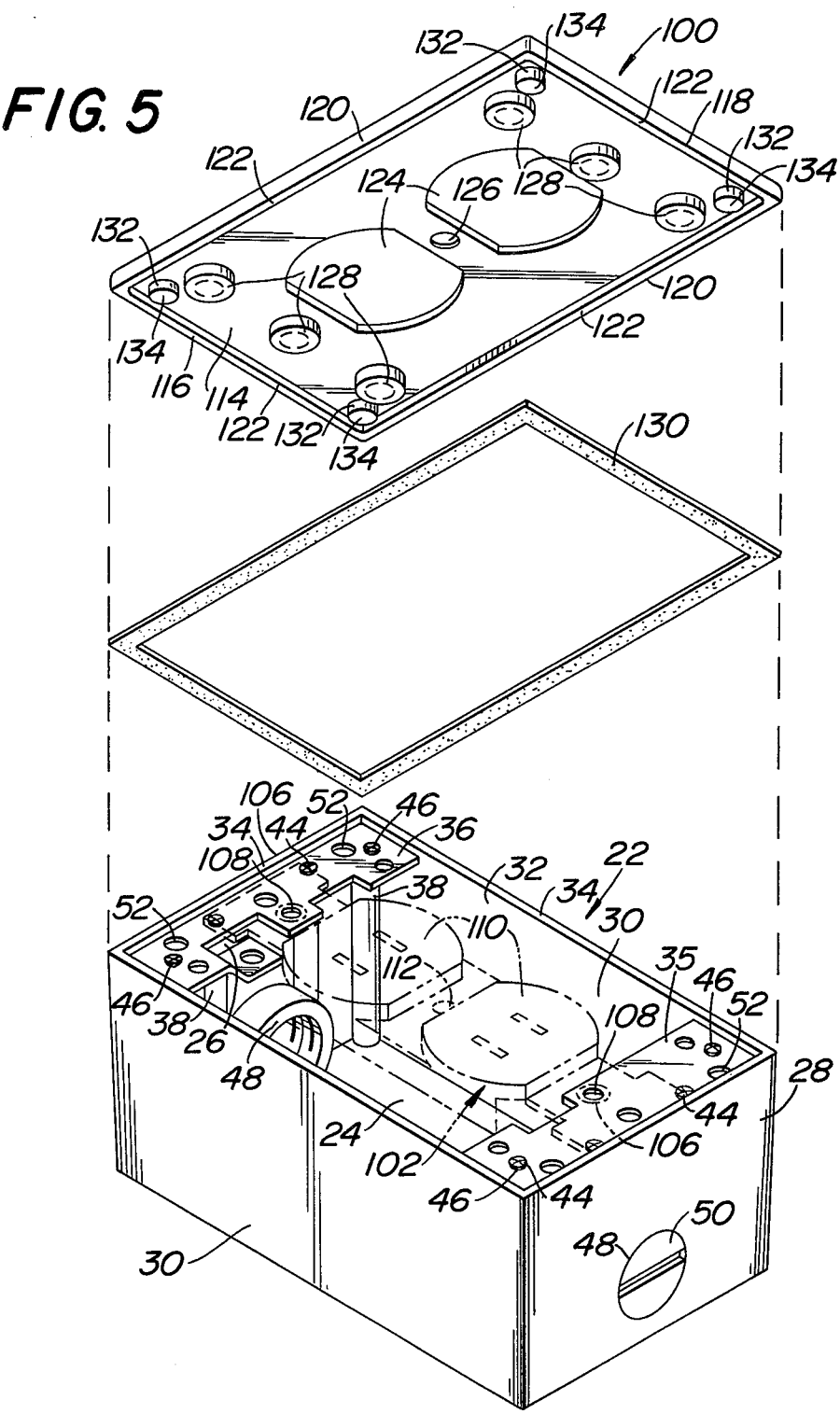
FIG. 5 is an exploded perspective view of a duplex receptacle cover in accordance with the instant invention and an associated conventional electrical junction box.

In FIG. 5 there is shown a duplex receptacle cover 100 in accordance with the instant invention. Cover 100 is arranged to seal an electrical junction box 22 having a conventional duplex receptacle 102 mounted therein. The duplex receptacle 102 is shown by phantom lines in FIG. 5. As is conventional, the receptacle 102 includes a pair of mounting tabs 104 which are adapted for disposition on the component mounting brackets 35 and 36 of the box 22. The receptacle 102 is held in place by the use of a pair of screws (not shown) extending through openings 106 in the tabs 104 and into aligned holes 108 in the brackets 35 and 36. The receptacle 102 includes a pair of slotted face plates 110, each of which is arranged to receive a conventional, two-pronged electrical plug (not shown). A threaded mounting hole 112 is located between the slotted face plates 110 and serves as the means for securing the cover 100 to the junction box 22. The cover 100 basically comprises a plate-like member 114 from the underside of which a top wall 116, a bottom wall 118 and an opposed pair of side walls 120 project downward. In accordance with the preferred embodiment of this invention, the plate 114 and the peripheral walls 116 and 120 are formed as a unitary structure. As can be seen, all of the walls 116-120 are the same height and together they extend continuously about the entire periphery of the plate portion 114 to form an open mouth. The walls are short in height so that the mouth defined therebetween is shallow.

Preferably the cover 100 is formed by a die casting process, and comprises a lightweight, water-resistant material, such as aluminum or aluminum alloy. The bottom peripheral edge of each of the walls 116-120 are coplanar and denoted by the reference numeral 122.

The length of each of the walls 116-120 of the cover is substantially the same as that of the corresponding wall of the box such that when the cover and the box are connected together the combined structure has substantially a continuous outer surface.

The plate portion 114 of the cover 100 includes a pair of openings 124, each of which is shaped to accommodate a respective slotted face plate 110 of the receptacle 102. A hole 126 is located in the cover plate portion 114 between the openings 124. A plurality of knock-outs 128 are located in the plate portion 114 at locations which align with holes 52 in the mounting brackets 35 and 36 of the junction box 22.

When the cover 100 is secured to the box 22 a preformed gasket 130, of corresponding size to the box and the cover, is interposed between the peripheral edge 122 of the cover 100 and the peripheral edge 34 of the side walls of the box 22. The cover 100 is secured to the box by extending a screw (not shown) through opening 126 in the cover and into the aligned threaded hole 112 in the receptacle 102 mounted within the box 22. The preformed gasket can be formed of any suitable type of resilient material, such as cork, rubber, etc.

Any of the knock-outs 128 can be used to secure the cover to the box by knocking out the central portion of the knock-out and extending a screw therethrough an into an aligned opening 52 in the mounting brackets 35 and 36 of the box.

Like the embodiment of the extender 20 described heretofore, the cover 100 includes means therein to ensure that when the screw or screws securing the cover to the box are tightened, the mounting brackets 35 and 36 are not pulled off their associated support pillars 38. To that end, as can be seen in FIG. 5, the cover 100 includes four projections or posts 132. Each post is located within a respective corner of the cover and projects from the inside surface of the plate portion 114 outward, with the free end 134 of each post lying in a common plane extending slightly beyond the peripheral edge 122 of the walls 116–120. Accordingly, when the screws are tightened, the free end 134 of each post applies pressure through gasket 130 to the top surface of the underlying bracket. This action provides a downward or holding force on each of the brackets 35 and 36 to counteract the upward force produced by the tightening of the screws mounting the cover on the box so that the brackets are held in place and are precluded from being pulled off their mounting pillars.

Figure 6:
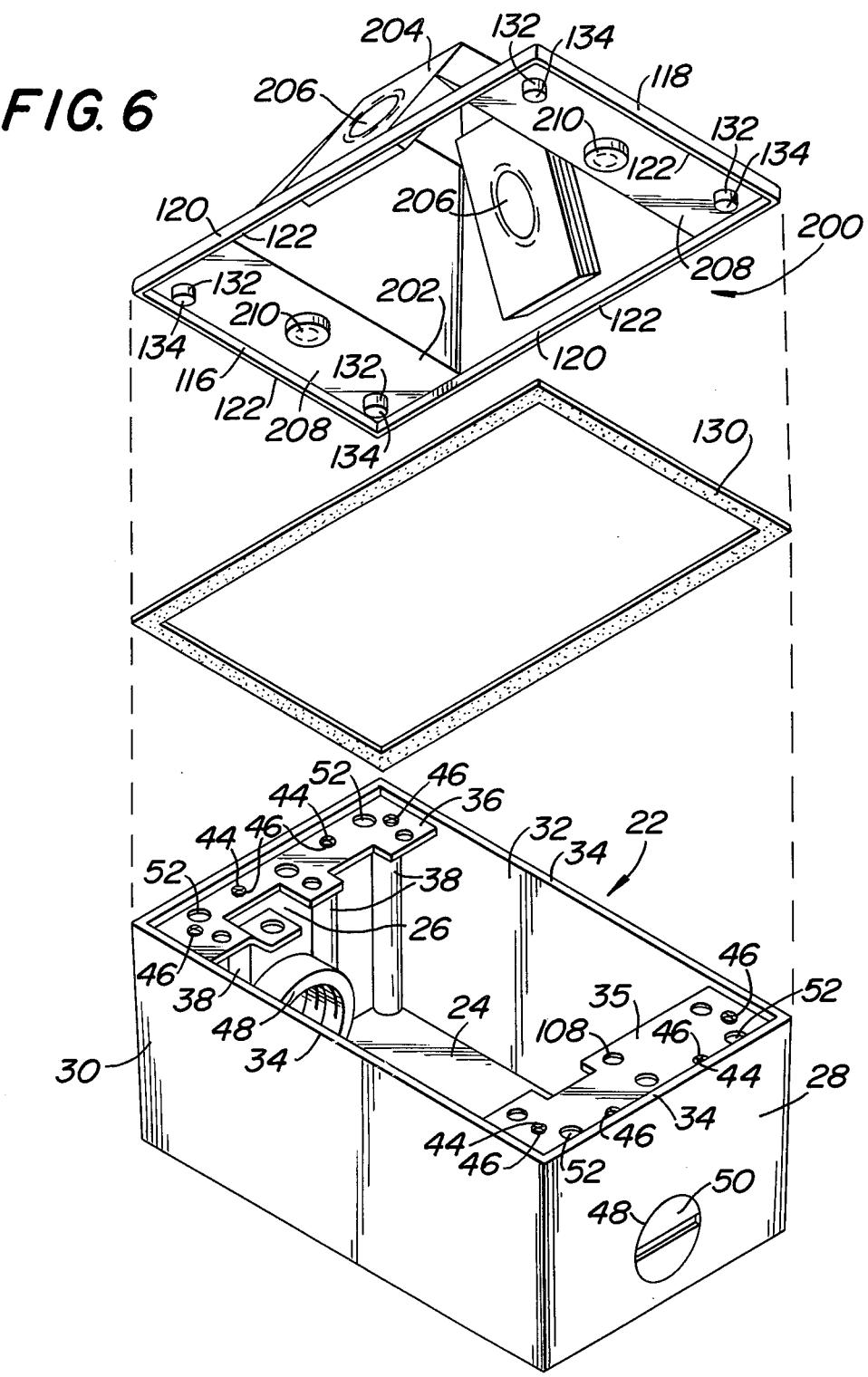
FIG. 6 is an exploded perspective view of an outdoor lighting fixture support cover in accordance with the instant invention and an associated conventional electrical junction box.

In FIG. 6 there is shown yet another embodiment of a cover in accordance with the instant invention. To that end, the cover shown in FIG. 6, is denoted by the reference numeral 200 and comprises an outdoor lighting fixture cover. The cover 200 is of the same basic construction as the cover 100 and comprises a plate portion 202, a top wall 116, a bottom wall 118 and a pair of side walls 120. The walls 116–120 are identical in construction to that described heretofore with reference to cover 100. The plate portion 202 includes conventional upwardly projecting hollow truncated pyramid portion 204. Plural threaded lighting fixture mounting holes 206 are located within the walls of the portion 204. The portions of the plate portion 202 contiguous with the top wall 116 and the bottom wall 118 are planar and are denoted by the reference numeral 208. Knock-out holes 210 are located in each portion 208 of the plate 202. When the central portion of each knock-out is removed the hole produced thereby serves as the means for securing the cover 200 to the box 22. To that end, a screw, not shown, is extended through each of the knock-out holes 210 to an aligned hole 52 in the mounting brackets 35 and 36.

Like cover 100, cover 200 includes four posts 132. Each post is located within a respective corner of the mouth of the cover and projects downward from the inside surface of portion 208 outward, with the free end 134 of each post lying in a common plane extending slightly beyond the peripheral edge of the walls 116–120 making up the cover. The posts 132 operate in an identical manner as that described heretofore with reference to cover 100 to provide a downward holding force on each of the brackets 35 and 36 to counteract the upward force produced by the tightening of the screws mounting the cover to the box so that the mounting brackets are held in place and are precluded from being pulled off their mounting pillars.

As should be appreciated from the foregoing, the box attachments of the instant invention are simple in construction, and can be made as integral members. In addition, their construction facilitates their ready connection to a conventional electrical junction box while precluding the mounting brackets of the junction box from being disconnected during or as a result of the assembly operation. Moreover, while the drawings of this application only show two types of covers and the extender, it is clear that any type of junction box cover can be constructed in accordance with the teachings of this invention.

Without further elaboration, the foregoing will so fully illustrate my invention that others may, by applying current or future knowledge, readily adapt the same for use under various conditions of service.

What is claimed as the invention is:

1. An extender for an electrical junction box including a back wall, a top wall and side walls defining an open cavity having a mouth, at least one separate mounting bracket disposed within said mouth and secured onto the top of a support member located within said cavity, said mounting bracket including at least one hole, said extender comprising a top wall, a bottom wall and side walls of the same length as those of said box and defining an open ring, said extender being arranged for securement to said box by the abutment of the peripheral edges of its wall with the peripheral edges of the walls of the box, said extender including at least one plate portion disposed within said ring and including a hole therein aligned with the hole in the mounting bracket, screw means extending through said aligned holes to secure the extender to the box and at least one projection located within the ring and having a free end extending slightly beyond the plane of the peripheral edges of the walls of the extender, whereupon said free end applies a holding force onto said mounting bracket when said screw is tightened, to thereby preclude said bracket from being pulled off of the top of said support member.

2. The extender of claim 1 wherein said projection is a cylindrical post and said support member is a pillar projecting upward toward the mouth of said box.

3. The extender of claim 2 wherein said mounting bracket also includes an aperture and wherein said pillar includes an end of reduced diameter which extends through the aperture in said bracket and is deformed thereon to secure the bracket in place.

4. The extender of claim 3 wherein said post is located in the corner of two walls of the extender.

5. The extender of claim 4 wherein the box comprises a pair of mounting brackets and wherein said extender comprises a pair of plate portions and a post located in each corner of said extender.

6. The extender of claim 5 wherein the peripheral edge of the walls of the extender is in the form of an outwardly extending lip and an inner ledge, said lip overlying the outside surface of the top wall, bottom wall and side walls of the box contiguous with their peripheral edge, said inner ledge having a bead of gasketing material secured thereto for abutment with the peripheral edge of the top wall, bottom wall and side walls of the box when the extender is secured thereto.

7. The extender of claim 6 wherein said extender is formed as an integral unit.

8. The extender of claim 7 wherein said integral unit is a cast metallic body.

9. The extender of claim 8 wherein said cast metallic body is aluminum.

10. An attachment for an electrical junction box including a back wall, a top wall and side walls defining an open cavity having a mouth, at least one separate mounting bracket disposed within said mouth and secured onto the top of a support member located within said cavity, said mounting bracket including at least one hole, said attachment comprising a top wall, a bottom wall and side walls of substantially the same length as those of said box and defining a mouth, said attachment being arranged for securement to said box by the abutment of the peripheral edges of its walls with the peripheral edges of the walls of the box, said attachment including at least one plate portion disposed within said mouth and including a hole adapted to receive screw means therein to secure the attachment to the box and at least one projection located within the mouth and having a free end extending slightly beyond the plane of the peripheral edges of the walls of the attachment, whereupon said free end applies a holding force onto said mounting bracket when said screw is tightened, to thereby preclude said bracket from being pulled off the top of said support member.

11. The attachment of claim 1 wherein said projection is a cylindrical post and said support member is a pillar projecting upward toward the mouth of said box.

12. The attachment of claim 11 wherein said mounting bracket also includes an aperture and wherein said pillar includes an end of reduced diameter which extends through the aperture in said bracket and is deformed thereon to secure the bracket in place.

13. The attachment of claim 12 wherein said post is located in the corner of two walls of the attachment.

14. The attachment of claim 13 wherein said attachment is formed as an integral unit.

15. The attachment of claim 14 wherein said integral unit is a cast metallic body.

16. The attachment of claim 15 wherein said cast metallic body is aluminum.

17. The attachment of claim 13 wherein said attachment is a cover.

* * * * *